US007178992B2

(12) United States Patent
Vafiades et al.

(10) Patent No.: US 7,178,992 B2
(45) Date of Patent: Feb. 20, 2007

(54) APPARATUS AND METHOD OF SIGNAL DETECTION IN AN OPTICAL TRANSCEIVER

(75) Inventors: Todd Vafiades, Scarborough, ME (US); Art Pharn, Huntington Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/902,468

(22) Filed: Jul. 30, 2004

(65) Prior Publication Data

US 2005/0105861 A1 May 19, 2005

Related U.S. Application Data

(60) Provisional application No. 60/520,646, filed on Nov. 18, 2003.

(51) Int. Cl.
*G02B 6/36* (2006.01)
*H04B 10/08* (2006.01)
*H04B 17/00* (2006.01)

(52) U.S. Cl. ........................... 385/88; 398/12; 398/15; 398/135

(58) Field of Classification Search .................. 398/12, 398/15, 135–139
See application file for complete search history.

(56) References Cited

U.S. PATENT DOCUMENTS

| | | | | |
|---|---|---|---|---|
| 5,119,224 A * | 6/1992 | Smith | 398/138 |
| 5,541,759 A * | 7/1996 | Neff et al. | 398/139 |
| 5,606,277 A * | 2/1997 | Feliz | 327/311 |
| 5,737,108 A * | 4/1998 | Bunch et al. | 398/135 |
| 5,798,670 A * | 8/1998 | Lee | 327/552 |
| 5,883,378 A * | 3/1999 | Irish et al. | 250/214 A |
| 6,215,816 B1 * | 4/2001 | Gillespie et al. | 375/219 |
| 6,360,277 B1 * | 3/2002 | Ruckley et al. | 709/250 |
| 2002/0069300 A1 * | 6/2002 | Pascolini | 709/250 |
| 2004/0022544 A1 * | 2/2004 | Case et al. | 398/137 |

* cited by examiner

*Primary Examiner*—Michelle Connelly-Cushwa
*Assistant Examiner*—Chris Chu
(74) *Attorney, Agent, or Firm*—Sterne, Kessler, Goldstein & Fox PLLC

(57) ABSTRACT

The present invention includes an optical transceiver having a fiber module with an optical data input and an electrical data output. The fiber module further includes a signal detect output that indicates the receipt of valid optical data. A physical layer device having a receive input is coupled to the electrical data output through a switch that is controlled by the signal detect output. The switch passes electrical data from the electrical data output of the fiber module to the receive input when the signal detect output indicates the receipt of valid optical data, and does not pass the electrical data when the signal detect output indicates invalid optical data. By using this configuration, the signal detects pins of the physical layer device are eliminated. In another embodiment, the switch is not utilized, and the electrical data output of the transceiver is ac-coupled to the differential receive input of the physical layer device. In this embodiment, the transceiver does not output electrical data when the optical data signal is invalid. Therefore, electrical data is identified at the receive input by the detection of a voltage variation on the differential receive input.

7 Claims, 5 Drawing Sheets

APPARATUS AND METHOD OF SIGNAL DETECTION IN AN OPTICAL TRANSCEIVER

CROSS REFERENCED TO RELATED APPLICATIONS

This application claims the benefit of U.S. Provisional Application No. 60/520,646, filed on Nov. 18, 2003, which is incorporated by reference herein in its entirety.

BACKGROUND OF THE INVENTION

1. Field of the Invention

The present invention generally relates to optical communications, and a method for reducing the number of pins on a physical layer device, such as an Ethernet device in an optical transceiver.

2. Background Art

High speed data links transmit data from one location to another over transmission lines. Optical data links are one type of high speed data link. In an Ethernet based optical data link, each link partner typically includes a fiber module transceiver that transmits and receives laser light. The fiber transceiver is also coupled to an Ethernet physical layer transceiver that processes the electrical signals sent to, and received from, the optical fiber module.

FIG. 1 illustrates a conventional link partner configuration for an Ethernet-based optical data link. Each link partner includes an Ethernet physical layer (PHY) 102 that transmits and receives electrical signals with a optical fiber transceiver module 106 (also called an "optical fiber module" or a fiber module, for short). The optical fiber module 106 converts the electrical signals from the Ethernet PHY 102 to optical data signals that are transmitted over an optical link to another link partner (not shown) via the optical port 114. Likewise, the fiber module 106 also receives optical data signals at the optical port 114 and converts these optical data signals to electrical signals that are sent to the Ethernet PHY 102. Between the Ethernet PHY 102 and the fiber module 106, each link partner includes a transmit termination 100, a receive termination 107, and a signal detect termination 112 that are discussed further below.

The transmit termination 100 of the Ethernet PHY includes a matching network 104, and two transmit pins 103*a* and 103*b* on the Ethernet PHY 102 that correspond to transmit pins TR on the fiber module 106. The receive termination 107 of the Ethernet PHY 102 includes a matching network 110, and two receive pins 108*a* and 108*b* on the Ethernet PHY 102 that correspond to receive pins RX on the fiber module 106. The signal detect termination 112 includes the Ethernet PHY 102 and the fiber module 106 and two signal detect pins 110 that correspond to signal detect pin SD on the fiber module 106.

During operation, the fiber module 106 sends a signal to the signal detect pins 110 to indicate the receipt of valid optical data. This is necessary because low power optical data signals can cause invalid electrical data to be sent to the Ethernet transceiver 102. The fiber module 106 de-asserts the signal detect 110 when the light input power decreases below a certain level (e.g. the fiber cable is removed or sliced). Vice versa, the signal detect 110 is asserted when the light input power increases above a certain level. The link on a 100Base-FX chip is a function of the signal detect input. When the signal detect is asserted, the link will be up and when the signal detect is de-asserted the link is down.

The separate signal detection (e.g. pins 110) on the Ethernet PHY 102 is utilized in the conventional system because invalid data can transmitted from the fiber module 106 to the receive pins 108. Therefore, the signal detect 110 is used to notify the Ethernet PHY 102 when the data should be recognized. For instance, a signal high on the signal detect lines should be used to indicate that data should be received and processed. A signal low indicates data should be ignored.

The transmit pins 103, the receive pins 108, and the signal detect pins 110 are implemented on a common substrate of the Ethernet transceiver 102, and are needed for each port of a multi-port Ethernet chip. Since substrate area is limited, the number pins becomes a limiting factor in determining how many channels can be serviced by an Ethernet PHY 102.

Therefore, what is needed is an apparatus and method for implementing and operating an optical transceiver that reduces the number of pins needed for each port.

BRIEF SUMMARY OF THE INVENTION

In one embodiment, the present invention includes an optical transceiver having an optical fiber module with an optical data input and an electrical data output. The optical fiber module further includes a signal detect output that indicates the receipt of valid optical data. A physical layer device having a receive input is coupled to the electrical data output through a switch that is controlled using the signal detect output. The switch passes electrical data from the electrical data output of the optical fiber module to the receive input when the signal detect output indicates the receipt of valid optical data, and does not pass the electrical data when the signal detect output indicates invalid optical data. By using this configuration, the signal detects pins of the physical layer device are eliminated from the physical layer device.

As a result, the substrate area and associated costs per chip are reduced.

In another embodiment, the switch is not utilized, and the electrical data output of the fiber module is ac-coupled to the differential receive input of the physical layer device. In this embodiment, the fiber module configured so that it does not output invalid electrical data. Therefore, electrical data is identified at the receive input by the detection of a voltage variation on the differential receive input of the physical layer device.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
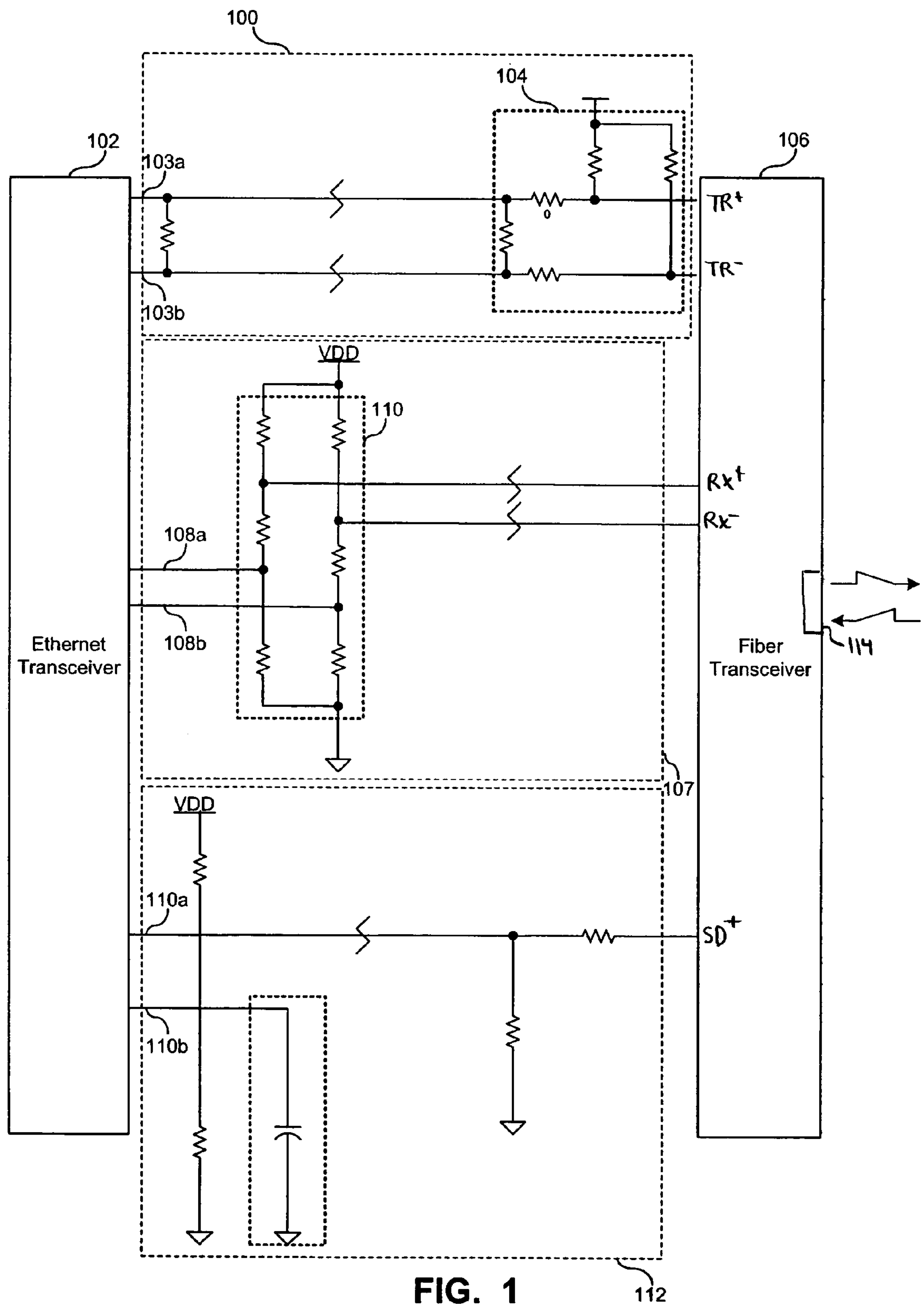
FIG. 1 illustrates a conventional optical transceiver utilizing signal detection.
Figure 2:
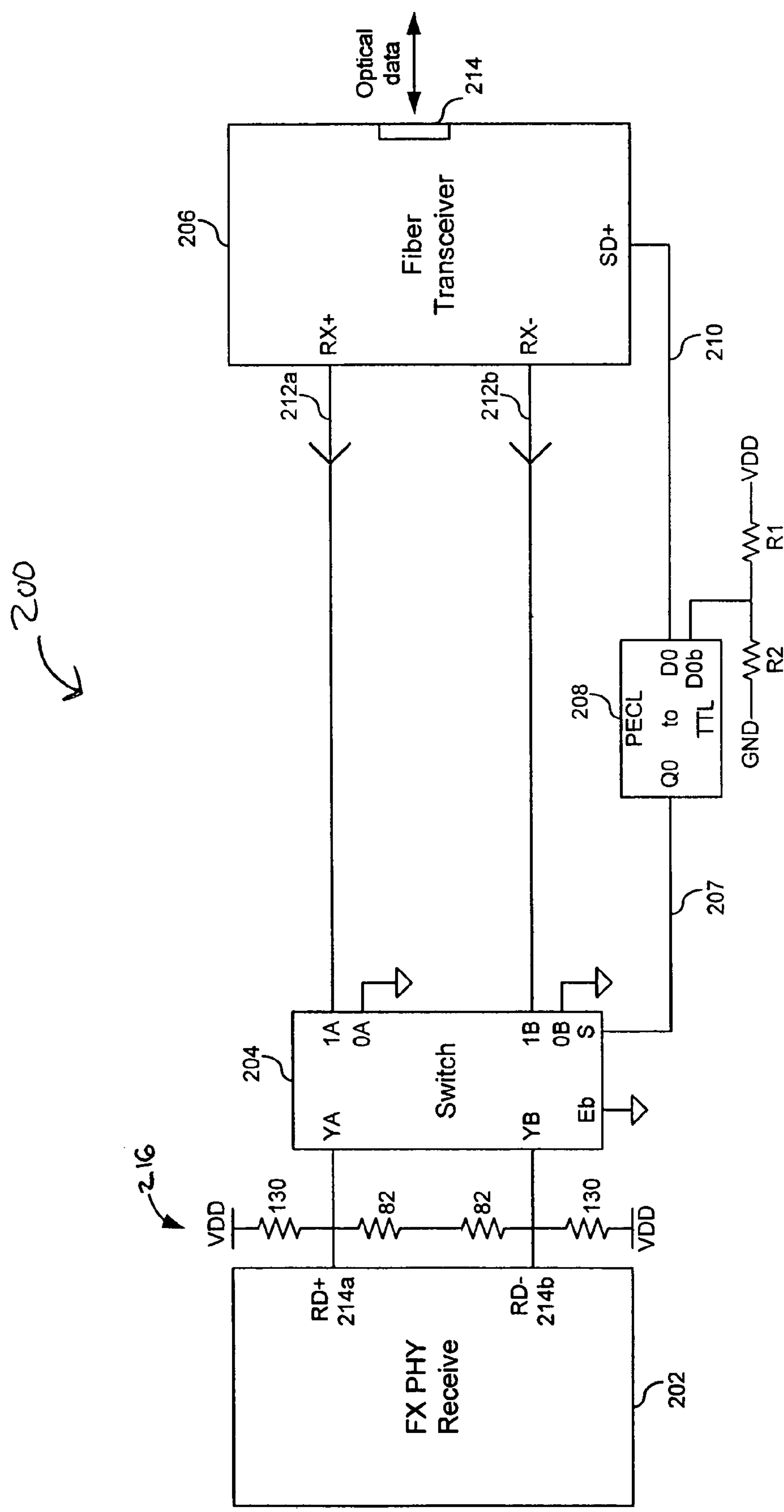
FIG. 2 illustrates an optical transceiver according to the present invention.

FIG. 2 illustrates a receive termination 200 of a physical layer device in an optical communications system according to embodiments of the invention. Receive termination 200 includes an Ethernet PHY 202, a switch 204, and a logic circuit 208. The switch 204 is disposed between the fiber module 206 and the Ethernet PHY 202 and is controlled by the logic module 208. The fiber module 206 includes a signal detect output 210 that indicates when valid optical data is being received at the optical data port 214.

Even though the invention is described below in terms of an Ethernet PHY, the invention is not limited to the Ethernet standard, or any other standard. In other words, those skilled in the arts will recognize that the invention could be used with in other physical layer devices besides an Ethernet physical layer device.

During operation, the fiber module 206 receives and transmits optical data signals from the optical port 214 to another link partner (not shown). The fiber module 206 sends electrical signals 212*a,b* to the Ethernet PHY 202 that represent the optical data signals received over the optical link at the optical port 214. However, the switch 204 gates the electrical signals from the fiber module 206 based on the signal detect output 210. More specifically, fiber module 206 asserts the signal SD+ when a valid optical data signal is received at the optical port 214, and de-asserts the signal detect when an invalid optical data signal is received. As discussed above, low power optical data signal typically represent invalid data or no data.

The logic circuit 208 monitors the signal detect output 210 and controls the switch 204 according to the state of the signal detect output 210. When the signal detect 210 indicates that valid optical data is received, the logic circuit 208 generates a control signal 207 that causes the switch 204 to pass the electrical signals 212*a,b* to the receive pins 214*a* and 214*b* for processing by the Ethernet PHY 202. When the signal detect output 210 indicates that an invalid optical data signal is received, then the logic circuit 208 generates the control signal 207 to cause the switch 204 to block the electrical signals 212*a,b* from the receive pins 214*a* and 214*b*.

The switch 204 is typically separate, and external from, the Ethernet PHY 202. As a result of this configuration, the Ethernet PHY 202 does not require a signal detect input pin on chip. More specifically, when compared to the Ethernet transceiver 102, the Ethernet transceiver 202 does not include a signal detect termination 102 or the corresponding signal detect pins 110, which reduces the number of pins on the Ethernet PHY substrate. This pin savings is amplified with the number of ports on a PHY substrate, where each port includes the receive termination, transmit termination, and their associated pins. In the conventional transceiver, each FX port would require approximately 5 to 6 pins. With this invention, only 4 pins are needed for each port (2 pins for transmit and 2 pins for receive). For an Ethernet chip with a high port count, such as an Octal transceiver, this invention would reduce the necessary pins by up to 16 pins which translates into a smaller substrate area, and reduced chip cost.

Receive termination 200 also includes a bias circuit 216 to provide a power supply to the Ethernet transceiver 202 and also to provide impedance control. For example, in one embodiment, the resistors in the bias circuit 200 are configured to provide a differential AC impedance of 100 ohms. However, other resistor values could be used.

In one embodiment, the optical communications system operates according to 100Base-FX mode. However, other standards and modes can be used.

Figure 3:
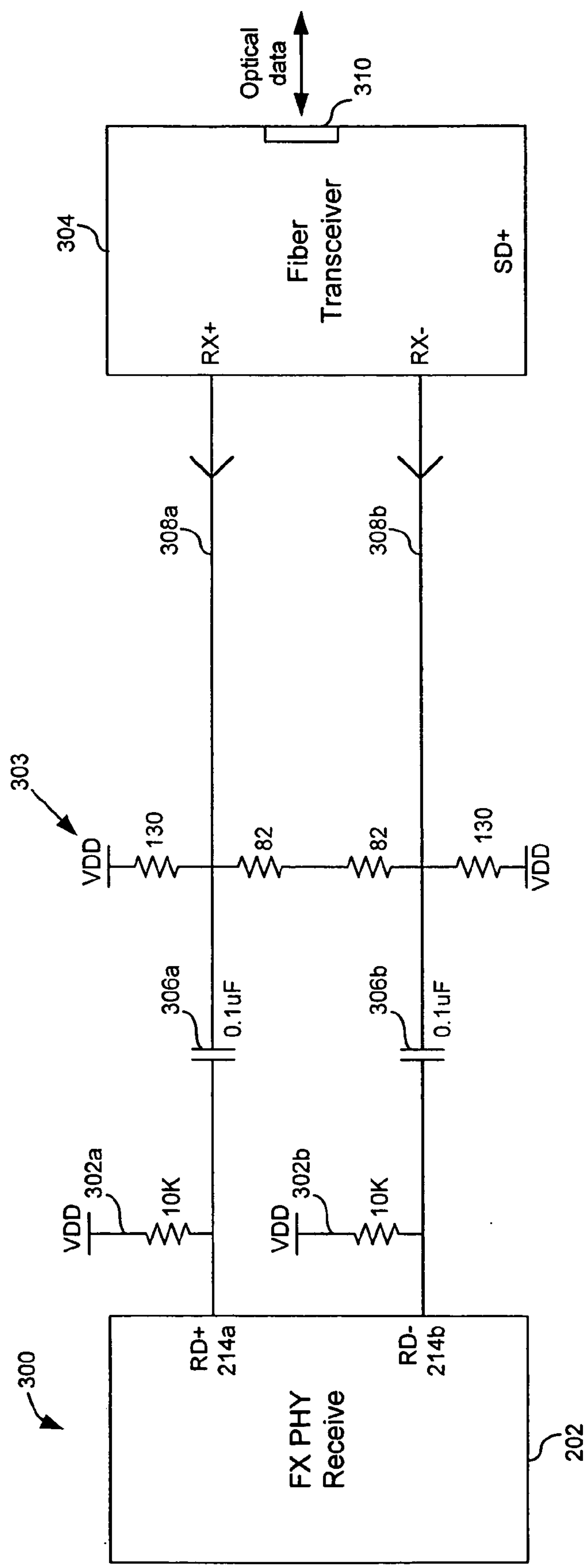
FIG. 3 illustrates an optical transceiver according to the present invention with ac-coupling of the receiver physical layer and the fiber module, where the fiber module does not send data to the receiver physical layer when the optical data is invalid.

FIG. 3 illustrates another embodiment 300 of the present invention, using a fiber module 304 that is ac-coupled using capacitors 306*a* and 306*b* to the Ethernet PHY 202. The fiber module 304 is configured such that it is does not transmit invalid data signals on the outputs 308*a* and 308*b*, when the optical data signal received at the optical port 310 is invalid for being below an amplitude or power threshold. For instance, the fiber module 304 can be an Agilent HRZBR 5903. Other fiber modules could be used that distinguish between valid and invalid optical data.

The bias circuits 302*a,b* set the bias for the receive pins 214*a,b* and the bias circuit 303 sets the bias for the corresponding pins on the fiber module 304. The ac-coupling prevents the bias 302 from interfering with the bias 303.

Still referring to FIG. 3, the Ethernet PHY 202 can detect incoming data by examining the receive pins 214*a* and 214*b*. If the voltage on these pins is constant (i.e. at the DC bias), then no valid data is being received from the fiber module 304. If there is voltage variation, then there is incoming data that must be causing the voltage variation. In other words, if there is a differential signal on RD− and RD+, then the link will be up and valid optical data is being received at the optical port 310. Otherwise, the link will be down. This embodiment is advantageous because it does not require external components (e.g. there is no switch 204 that is needed to gate the electrical signals from the fiber module 304). Furthermore, the signal detect in the fiber module 304 is not even examined, eliminating circuitry and their associated output pins. In one embodiment, the blocking capacitors 306*a* and 306*b* are implemented inside the fiber module 304.

Figure 4:
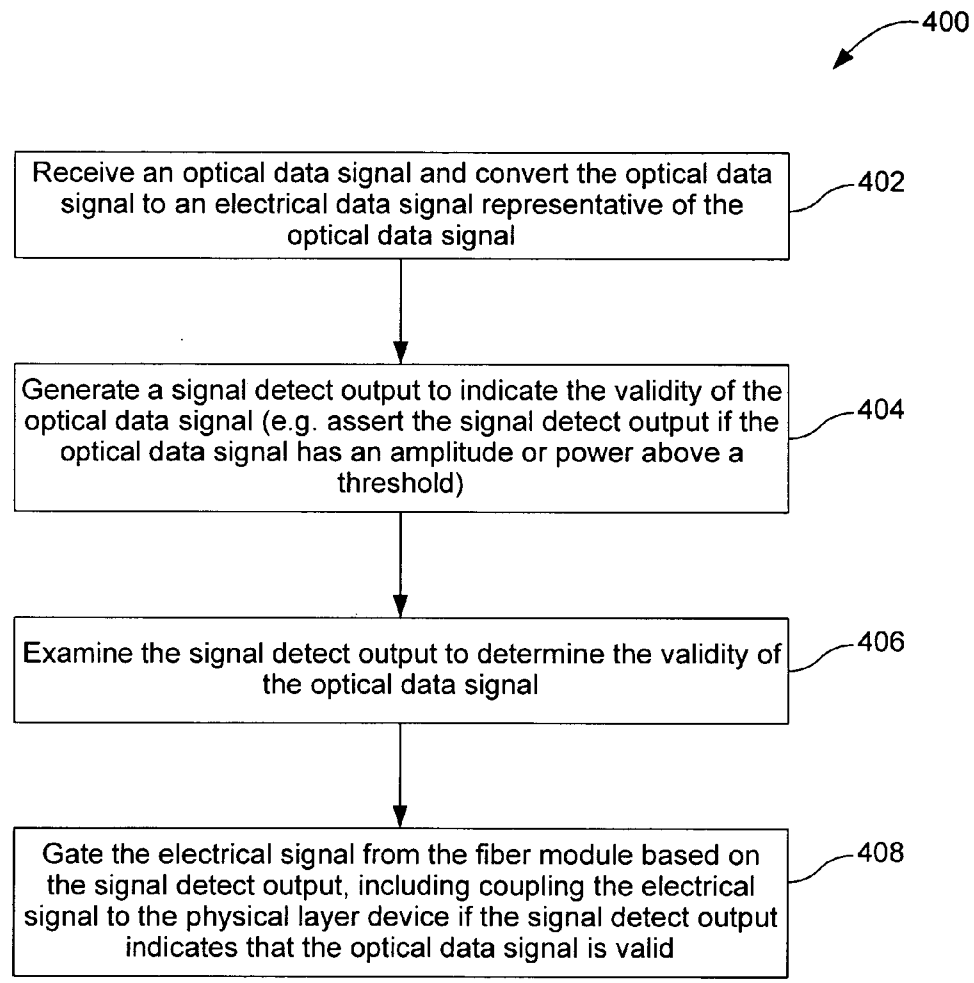
FIG. 4 illustrates a flowchart that further describes operating an optical transceiver according to embodiments of the invention.

FIG. 4 illustrates a flowchart 400 that further describes operation of the invention using the switch configuration of FIG. 2, and is discussed further below.

In step 402, an optical data signal is received and converted to an electrical data signal representative of the optical data signal. For example, the fiber module 206 receives optical data at the optical port 214 and converts the optical data signal to an electrical data signal that is compatible with a physical layer device, such as an Ethernet transceiver.

In step 404, a signal detect output is generated based on the validity of the optical data signal. For example, fiber module 206 asserts the signal detect output if the optical data signal has an amplitude or power above a threshold. The fiber module 206 de-asserts the signal detect output if the optical data signal has an amplitude or power that is below a threshold. Step 404 can be performed simultaneous with, or prior to, step 402.

In step 406, the signal detect output is examined to determine the validity of said optical data signal. For example, the logic module 208 examines the signal detect output to control the switch 204.

In step 408, the electrical signal from the fiber module is gated based on said signal detect output. The gating step includes coupling the electrical signal to the physical layer device if the signal detect output indicates that the optical data signal is valid. For example, the switch 204 couples the electrical signal from the fiber module 206 to the Ethernet transceiver 102 when the logic module 208 detects that the signal detect output 110 has been asserted. The switch 204 de-couples the electrical signal from the fiber module 206 when the logic module 208 detects an unasserted signal detect output.

Figure 5:
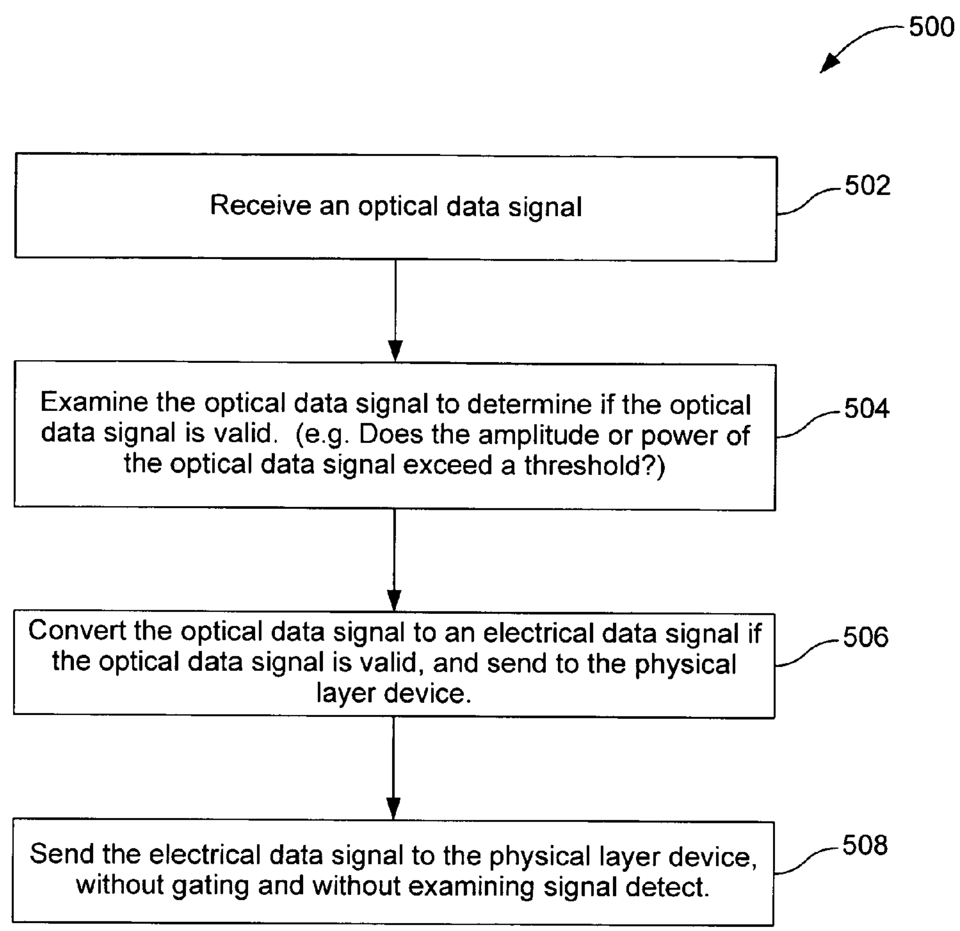
FIG. 5 illustrates a second flowchart that further describes operating an optical transceiver according to embodiments of the invention.

FIG. 5 illustrates a flowchart 500 that further describes operation of the invention using the configuration of FIG. 3, which does not include a switch configuration because invalid data is sent by the fiber module.

In step 502, an optical data signal is received. For example, the fiber module 304 receives optical data at the optical port 310.

In step 504, the optical data signal is examined to determine if the optical data signal is valid. For example, the fiber module 304 examines the amplitude of the optical data received at the optical port 310 to determine if it exceeds a threshold. If so, then the optical data is valid.

In step 506, the optical data is converted to electrical data signal if the optical data signal is valid. For example, the fiber module 304 converts valid optical data received at the port 310 to electrical data for transmission to the Ethernet transceiver 202.

In step 508, the electrical data signal is sent to the physical layer device, without gating the electrical data signal and without examining the signal detect output.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An optical transceiver, comprising:

a fiber module having an optical data input and an electrical data output, said fiber module having a signal detect output that indicates validity of an optical data signal received at said optical data input; and a physical layer device having a receive input; and a switch, coupled between said electrical data output and said receive input of said physical layer device, that is controlled by said signal detect output, wherein said switch includes an electrical data input that is coupled to said electrical data output of said fiber module, and said switch includes a signal detect input that is coupled to said signal detect output of said fiber module;

wherein said switch passes electrical data from said electrical data output of said fiber module to said receive input of said physical layer device when said signal detect output indicates said optical data signal is valid, and does not pass said electrical data when said signal detect output indicates said optical data signal is invalid.

2. The optical transceiver of claim 1, wherein said signal detect output is asserted when said optical data signal is above an amplitude threshold to indicate said optical data signal is valid, and is not asserted when said optical data signal is below an amplitude threshold to indicate said optical data signal is invalid.

3. The optical transceiver of claim 1, wherein said physical layer device is an Ethernet device.

4. The optical transceiver of claim 1, wherein said fiber module operates according to a 100Base-FX mode.

5. The optical transceiver of claim 1, further comprising a logic module that examines said signal detect output and controls said switch based on said signal detect output.

6. In an optical transceiver having a physical layer device and a fiber module, said fiber module receiving an optical data signal and converting said optical data signal to an electrical signal, said fiber module further having a signal detect output that indicates validity of said optical data signal, a method comprising:

receiving the optical data signal;

examining said signal detect output to determine validity of said optical data signal; and gating said electrical signal from said fiber module based on said signal detect output, wherein said electrical signal is separate and distinct from said signal detect output, said gating step including coupling said electrical signal to said physical layer device if said signal detect output indicates that said optical data signal is valid.

7. The method of claim 6, further comprising the step of asserting said signal detect output if said optical data signal is above an amplitude threshold, and de-asserting said signal detect output if said optical data signal is below an amplitude threshold.

* * * * *